3,087,927
METHOD OF PREPARING 21-SULFONATED STEROIDS OF THE PREGNANE SERIES
Robert B. Brownfield, Spring Valley, N.Y., and Charles Krieger, Clifton, N.J., assignors to American Cyanamid Company, New York, N.Y., a corporation of Maine
No Drawing. Filed July 7, 1961, Ser. No. 122,413
7 Claims. (Cl. 260—239.55)

This invention relates to 21-substituted steroids of the pregnane series. More particularly, it relates to 21 substituted 16α,17α-dihydroxy pregnenes and pregnadienes.

The preparation of 21-monoesters of steroids of the pregnane series which initially contained reactive hydroxyl groups at $C_{16}$ and $C_{21}$ has presented a difficult problem in the past. This was because of the fact that any esterification of 16α,17α,21-trihydroxy steroids resulted primarily in 16α,21-diesterification with small amounts of the 16α- and 21-monoesterified steroids. The separation and purification of the 21-monoester has been found difficult, costly and time consuming.

It is well known that certain 21-monoesters, notable the methanesulfonates and p-toluenesulfonates, have found wide use as intermediates for the preparation of various pharmaceutically useful 21-substituted steroids by virtue of their ability to undergo facile displacement reactions when treated with other nucleophiles. For example, 21-alkyl (or aryl) sulfonated steroids can be readily converted to the corresponding 21-phosphorylated steroids either directly or via the intermediate 21-halo steroids. Thus the availability of 21-phosphorylated steroids, which are active glucocorticoids exhibiting high water solubility and good stability, is directly dependent upon the availability of the corresponding 21-alkyl (or aryl) sulfonated steroids. While 21-alkyl (or aryl) sulfonated derivatives of steroids containing only one reactive hydroxyl group ($C_{21}$) are easily prepared by known methods, the preparation and isolation of the corresponding derivatives of steroids containing more than one reactive hydroxyl group (e.g. $C_{16}$ and $C_{21}$) is accomplished only with extreme difficulty.

We have now found that 21-alkyl (or aryl) sulfonated derivatives of steroids containing reactive hydroxyl groups at $C_{16}$ and $C_{21}$ can be prepared in good yield and with ease. We have also found that these 21-alkyl (or aryl) sulfonated steroids can be converted by known methods to other 21-monosubstituted steroids in general and to 21-monophosphorylated steroids in particular as shown hereinafter.

The compounds prepared by the process of the present invention may be illustrated by the following formula:

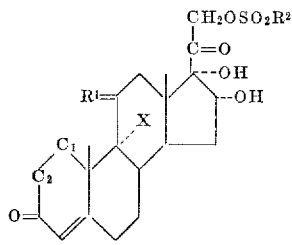

wherein —$C_2$—$C_1$— is a divalent radical of the group consisting of

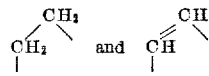

X is a monovalent radical of the group consisting of hydrogen and fluorine radicals, $R^1$ is a member of the group consisting of $$HO(\beta)\diagdown$$
$$H(\alpha)\diagup$$

$H_2=$, and $O=$ groups and $R^2$ is a member of the group consisting of lower alkyl and mononuclear aryl radicals.

The starting materials utilizable in the process of the present invention can be, for example, 9α-fluoro-11β,16α,17α,21-tetrahydroxy-1,4-pregnadiene-3,20-dione;
9α-fluoro-11β,16α,17α,21-tetrahydroxy-4-pregnene-3,20-dione;
11β,16α,17α,21-tetrahydroxy-4-pregnene-3,20-dione;
16α,17α,21-trihydroxy-4-pregnene-3,11,20-trione;
16α,17α,21-trihydroxy-4-pregnene-3,20-dione;
11β,16α,17α,21-tetrahydroxy-1,4-pregnadiene-3,20-dione;
16α,17α,21-trihydroxy-1,4-pregnadiene-3,11,20-trione;
9α-fluoro-16α,17α,21-trihydroxy-1,4-pregnadiene-3,11,20-trione;

and the like.

Using the above steroids in a process illustrated in the flowsheet hereinafter as (I and Ia) to (II and IIa), the 16α,17α-alkoxy alkylidenedioxy derivatives of steroids of the pregnane series are prepared. The steroids described above are reacted with an ortho ester of the formula: $R^3C(OR^4)_3$ wherein $R^3$ is hydrogen or lower alkyl and $R^4$ is lower alkyl. These compounds can be triethyl ortho formate, triethyl ortho acetate, trimethyl ortho propionate, trimethyl ortho acetate, trimethyl ortho formate and the like. The reaction to prepare the steroids (II and IIa) of the flowsheet is carried out usually in the presence of a mineral acid. The reaction will take place at a temperature within the range of from about 15° to about 60° C. and is usually complete in a period of from a few minutes to about an hour. As shown in the flowsheet hereinafter, the structures of steroids (II) differ depending upon the degree of unsaturation in the A-ring. 1,4-pregnadiene-3,20-diones (I) react with ortho esters to give steroids (II) in which the A-ring structure is unaltered. However, 4-pregnene-3,20-diones (Ia) react with ortho esters to give steroids (IIa) in which ring A has been altered to a conjugated enol ether. Such A-ring alterations, evident in the flowsheet in steroids [IIa and IIIa (described below)] do not influence the A-ring structure of the subject steroids (IV) since in the final step of the present invention (e.g. steroids IIIa to IV) the original A-ring structure is regenerated by acid hydrolysis.

The preparation of the compounds illustrated in the flowsheet as (III and IIIa) takes place by reacting the compounds of (II and IIa) with a lower alkyl sulfonyl halide or a mononuclear aryl sulfonyl halide. These sulfonyl halides may be, for example, methanesulfonyl chloride, benzenesulfonyl chloride, p-toluenesulfonyl chloride and the like. Usually it is desirable to carry out this reaction in a solvent which acts as an acid acceptor, such as pyridine. Alternatively, the solvent may be, for example, dimethylformamide or dioxane along with an acid acceptor such as pyridine, triethylamine or the like. The reaction is preferably carried out at a temperature within the range of from about —20° C. to about 35° C. The reaction is usually complete in a few hours, however, the period may vary from about 2 to about 24 hours. The product is usually insoluble in water and it may be recovered by filtration after stirring the final reaction mixture into cold water.

The steroids illustrated by (IV) of the flowsheet are prepared from the steroids of (III and IIIa) by subjecting them to acid hydrolytic conditions to regenerate the vicinal cis-dihydroxy groups in the 16α,17α-positions and (in the case of parent 4-pregnene-3-ones) the Δ⁴-3-one function in ring A. The hydrolysis may be carried out by dissolving the steroids of (III and IIIa) in a solvent such as chloroform or methylene chloride containing a catalytic amount of a mineral acid such as concentrated hydrochloric acid at a temperature within the range of from about 25° to about 65° C. Under these conditions the reaction is complete in a period of from about one to about 24 hours and the product, being insoluble in these relatively non-polar solvents, may be filtered directly from the reaction mixture or isolated by other conventional means. Alternatively the steroids of (III and IIIa) may be suspended in a solvent such as methanol and treated with an aqueous mineral acid such as dilute hydrochloric acid at a temperature in the range of about 25° to about 65° for a period of from about one hour to about 24 hours. In practice, complete hydrolysis is effected by warming the methanolic reaction mixture to the reflux temperature for a period of about one hour. The product steroids of (IV) may be isolated from the cooled reaction mixture by filtration either directly or after dilution of the reaction mixture with water. Frequently, it is not necessary to purify the steroids of III and IIIa and the crude products are merely subjected to the hydrolytic conditions to yield the final products (IV).

The following flowsheet illustrates the various reactions of the present invention.

FLOWSHEET

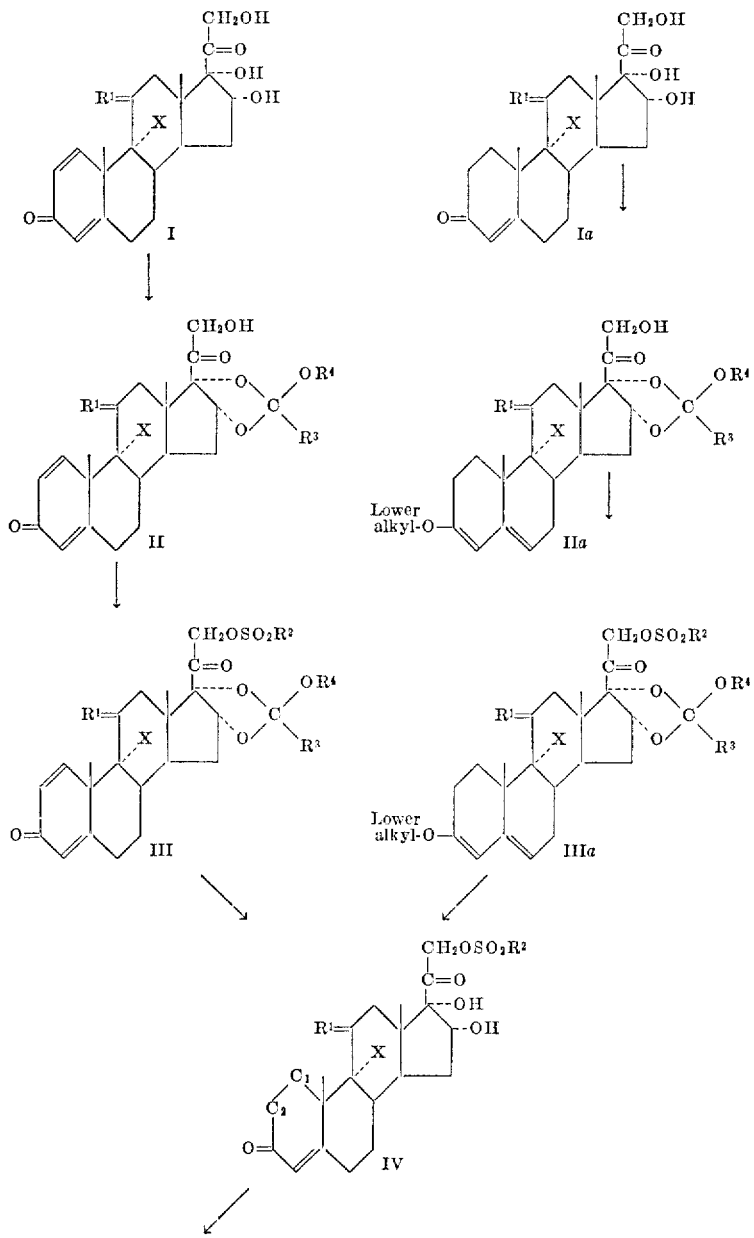

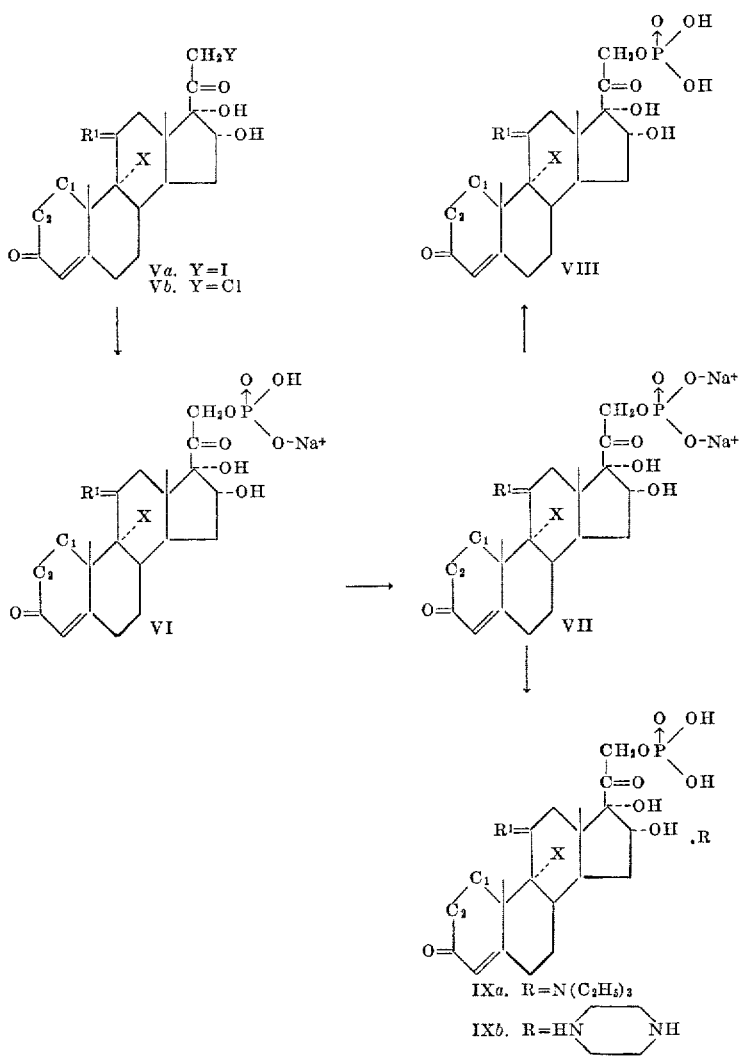

in which $R^1$, $R^2$, $R^3$, $R^4$ and X are as defined above.

There has long been a need for a highly water soluble form of a 16α-hydroxylated active steroid such as triamcinolone for pharmaceutical preparations. Steroid derivatives such as borate salts and salts of half esters of steroids (e.g. the 21-sodium hemisuccinate) have been prepared in an effort to obtain such water soluble forms, however, these forms have shown poor stability characteristics. On the other hand, 21-phosphate esters of steroids which can be prepared, as shown in the flowsheet, from steroids (IV) have been found to be more stable and are superior as highly water soluble forms. The process of the present invention for preparing 21-lower alkyl sulfonated and 21-mononuclear aryl sulfonated steroids having 16α,17α-dihydroxy groups thus provides a valuable means of preparing 21-phosphate esters. As shown in the flowsheet, steroid 21-phosphate esters and metal or amine salts thereof (VI–IXb) can be prepared either directly or by means of the corresponding 21-halides (Va and Vb).

The following examples describe in detail the preparation of 21-lower alkyl sulfonated and 21-mononuclear aryl sulfonated steroids of the present invention as well as the preparation therefrom of 21-phosphate esters of 16α-hydroxylated steroids.

The 21-phosphate esters in the form of their metal or amine salts possess high water-solubility, high physiological activity and good stability properties.

EXAMPLE I

*Preparation of 9α-Fluoro-11β-Hydroxy-16α,17α-Methoxy-Methoxymethylenedioxy-1,4-Pregnadiene-3,20-Dione*

The compound 9α-fluoro-11β,16α,17α,21-tetrahydroxy-1,4-pregnadiene-3,20-dione, 30 g. (76.1 mmoles) is suspended in a solution made up of 300 ml. of reagent grade dioxane, 30.0 ml. (29.1 g., 274 mmoles) trimethyl orthoformate and 1.20 ml. of absolute methanol. To the rapidly stirred (mechanical) suspension there is added dropwise 0.60 ml. concentrated sulfuric acid. The suspension thins continuously during the first few minutes and complete solution is effected within six minutes. Pyridine, 1.80 ml., is added immediately (if the reaction is allowed to proceed longer than the specified six minutes the solution becomes deep red and finally an opaque wine color. Quenching of the reaction mixture with pyridine before the red coloration develops has given the product in higher yield and better initial purity) whereupon the faint pink coloration is discharged and the resulting solution is light yellow in color. The entire process to this point is carried out at room temperature. The quenched reaction solution is placed in a separatory funnel, the stem of which is immersed below the surface of three liters of a water-ice mixture contained in a large beaker. The reaction mixture is added slowly (over a period of 2 to 3 hours) to the vigorously agitated ice-water mixture. The white solid product which forms is allowed to stand in the aqueous solution at 5° C. overnight and then removed by filtration. The product is finally washed well with water and air dried, 28.7 g. (65.8 mmoles, 86.5%). On this scale the yields have ranged from 69% to 87%. Several crystallizations from acetone-petroleum ether gives an analytical specimen of 9α - fluoro - 11β,21 - dihydroxy-16α,17α - methoxymethylenedioxy - 1,4 - pregnadiene-3,20-dione as colorless crystalline solid, melting point 207.5–208.5° C. (dec.) which is homogeneous by paper chromatography ($R_f$ 0.29) in the system toluene:petroleum ether (30°–60°):methanol:water (1.2:0.8:1.3:0.7); $\nu_{max.}$ 1713, 1659 and 1618 cm.$^{-1}$.

EXAMPLE II

*Preparation of 9α-Fluro-11β-Hydroxy-16α,17α-Methoxymethylenedioxy - 21 - Methanesulfonyloxy - 1,4 - Pregnadiene-3,20-Dione*

The compound 9α-fluoro-11β,21-dihydroxy-16α,17α-methoxymethylenedioxy-1,4-pregnadiene-3,20-dione, 9.63 g. (22.1 mmoles), is dissolved in 100 ml. of dry pyridine and the solution is cooled in an ice-water bath. Methanesulfonyl chloride, 3.31 g. (28.9 mmoles), is added slowly and with stirring to the cold pyridine solution. The reaction mixture (a hazy solution) is stirred at ice-bath temperature for one hour and then stored at −10° C. overnight. The reaction mixture is poured into ice water with stirring, the solid product is removed by filtration, washed with water, 1.4 N hydrochloric acid (50 ml.) and finally water-washed until the washes are neutral to litmus paper. The air dried product amounts to 11.03 g., melting point 201.5–202.5° C. (dec.). Refrigeration of the combined mother liquor and aqueous washes gives an additional 0.14 g. of solid. The total yield of crude product amounts to 11.17 g. (21.7 mmoles, 98.2%). An analytical sample of 9α-fluoro-11β-hydroxy - 16α,17α - methoxymethylenedioxy - 21 - methanesulfonyloxy-1,4-pregnadiene-3,20-dione as long, colorless needles is obtained by repeated recrystallization from methanol, melting point 202.5–203.5° C. (dec.); $\nu_{amx.}$ 1732, 1649, 1605, 1357 and 1174 cm.$^{-1}$; $[\alpha]_D^{25°}+114°$ (c.=1.058, methyl Cellosolve, 1 dm.);

$\lambda_{max.}^{MeOH}$ 238 mμ, ε16,500

EXAMPLE III

*Preparation of 9α-Fluoro-11β,16α,17α-Trihydroxy-21-Methanesulfonyloxy-1,4-Pregnadiene-3,20-Dione*

To 9α-fluoro-11β-hydroxy-16α,17α-methoxy methylenedioxy - 21 - methanesulfonyloxy - 1,4 - pregnadiene-3,20-dione, 10.3 g. (20.0 mmoles), is added 500 ml. of absolute methanol and 20.0 ml. of dilute hydrochloric acid is added. The stirred suspension is brought to reflux whereupon complete solution is effected. After about 20 minutes the solid begins to separate and the amount of solid which separates during an additional 20 minutes at reflux increases continuously (total reflux time 40 minutes). The mixture is refrigerated overnight (5° C.) and the solid product is removed by filtration. After washing with cold methanol and air drying, the product amounts to 8.27 g., melting point 198.0–199.5° (dec.). Concentration of the mother liquors gives an additional 0.61 g. of product as colorless solid. Combined crude yield—8.88 g. (18.8 mmoles, 94.0%). Several crystallizations from methanol gives an analytical specimen of 9α-fluoro-11β,16α,17α-trihydroxy-21-methanesulfonyloxy-1,4-pregnadiene-3,20-dione as fine colorless needles, melting point 197.0–197.5° C. (dec.); $\nu_{max.}$ 1730, 1660, 1618, 1340 and 1170 cm.$^{-1}$; $[\alpha]_D^{26°}$ +54.8° (c.=0.803, methyl Cellosolve, 1 dm.);

$\lambda_{max.}^{MeOH}$ 238 mμ, ε15,100

EXAMPLE IV

*Preparation of 9α-Fluoro-11β-Hydroxy-16α,17α-Methoxymethylenedioxy - 21 - p - Toluenesulfonyloxy - 1,4-Pregnadiene-3,20-Dione*

Using the process described in Example II and substituting p-toluenesulfonyl chloride for methanesulfonyl chloride, the above identified steroid is obtained in good yield, $\nu_{max.}$ 1730, 1660, 1613, 1361 and 1177 cm.$^{-1}$.

EXAMPLE V

*Preparation of 9α-Fluoro-11β,16α,17α-Trihydroxy-21-p-Toluenesulfonyloxy-1,4-Pregnadiene-3,20-Dione*

The product of Example IV, 9α-fluoro-11β-hydroxy-16α,17α - methoxymethylenedioxy - 21 - p - toluencsulfonyloxy-1,4-pregnadiene-3,20-dione, is heated with absolute methanol and dilute hydrochloric acid as described in Example III. The desired trihydroxy steroid is obtained in good yield, melting point 181–182° C. (dec.); $\nu_{max.}$ 1725, 1659, 1603, 1370 and 1178 cm.$^{-1}$.

EXAMPLE VI

*Preparation of 3-Methoxy-11β,21-Dihydroxy-16α,17α-Methoxymethylenedioxy-3,5-Pregnadiene-20-One*

The compound 11β,16α,17α,21-tetrahydroxy - 4-pregnene-3,20-dione, 1.00 g., is reacted with trimethyl orthoformate by the method of Example I to give 0.87 g. of 3-methoxy-11β,21 - dihydroxy-16α,17α - methoxymethylene-dioxy-3,5-pregnadiene-20-one. An analytical sample showed a melting point of 176–177° C.; $\nu_{max.}$ 1715, 1657, 1631 and 1170 cm.$^{-1}$.

EXAMPLE VII

*Preparation of 3-Methoxy-11β - Hydroxy-16α,17α-Methoxymethylenedioxy-21-Methanesulfonyloxy - 3,5-Pregnadiene-20-One.*

The compound 3-methoxy-11β,21-dihydroxy-16α,17α-methoxymethylenedioxy-3,5-pregnadiene-20-one, 0.36 g., is treated with methanesulfonyl chloride by the method of Example II to give 0.29 g. of 3-methoxy-11β-hydroxy-16α,17α - methoxymethylenedioxy-21 - methanesulfonyloxy-3,5-pregnadiene-20-one; $\nu_{max.}$ 1725, 1650, 1348 and 1170 cm.$^{-1}$.

EXAMPLE VIII

*Preparation of 11β,16α,17α-Trihydroxy-21-Methanesulfonyloxy-4-Pregnene-3,20-Dione*

The compound 3-methoxy - 11β - hydroxy-16α,17α-methoxymethylenedioxy - 21 - methanesulfonyloxy - 3,5-pregnadiene-20-one is treated with dilute hydrochloric acid in absolute methanol by the method of Example III to give 11β,16α,17α-trihydroxy-21-methanesulfonyloxy-4-pregnene-3,20-dione; $\nu_{max.}$ 1722, 1650, 1349 and 1170 cm.$^{-1}$.

EXAMPLE IX

*Preparation of 9α-Fluoro-21-Hydroxy-16α,17α-Methoxymethylenedioxy-1,4-Pregnadiene-3,11,20-Trione*

The compound 9α-fluoro - 16α,17α,21-trihydroxy-1,4-pregnadiene-3,11,20-trione is reacted with trimethyl orthoformate according to the method of Example I to give 9α-fluoro-21-hydroxy-16α,17α - methoxymethylenedioxy-1,4-pregnadiene-3,11,20-trione.

EXAMPLE X

*Preparation of 9α-Fluoro - 16α,17α - Methoxymethylenedioxy-21 - Methanesulfonyloxy-1,4 - Pregnadiene-3,11, 20-Trione*

The compound 9α-fluoro-21 - hydroxy-16α,17α-methoxymethylenedioxy-1,4-pregnadiene-3,11,20-trione is reacted with methanesulfonyl chloride according to the method of Example II to give 9α-fluoro-16α,17α-methoxymethylenedioxy-21 - methanesulfonyloxy - 1,4-pregnadiene-3,11,20-trione.

EXAMPLE XI

*Preparation of 9α-Fluoro-16α,17α - Dihydroxy-21-Methanesulfonyloxy-1,4-Pregnadiene-3,11,20-Trione*

The compound 9α-fluoro-16α,17α-methoxymethylenedioxy-21 - methanesulfonyloxy-1,4 - pregnadiene-3,11,20-trione is hydrolyzed in absolute methanol with dilute hydrochloric acid according to the method of Example III to give 9α-fluoro-16α,17α - dihydroxy-21-methanesulfonyloxy-1,4-pregnadiene-3,11,20-trione.

EXAMPLE XII

*Preparation of 3-Methoxy-21-Hydroxy-16α,17α-Methoxymethylenedioxy-3,5-Pregnadiene-20-One*

The compound 16α,17α,21-trihydroxy-4-pregnene-3,20-dione is reacted with trimethyl orthoformate according to the method of Example I to give 3-methoxy-21-hydroxy-16α,17α - methoxymethylenedioxy - 3,5-pregnadiene-20-one.

EXAMPLE XIII

*Preparation of 3-Methoxy-16α,17α-Methoxymethylenedioxy-21-Methanesulfonyloxy-3,5-Pregnadiene-20-One*

The compound 3-methoxy-16α,17α-methoxymethylenedioxy-21-hydroxy-3,5-pregnadiene-20-one is treated with methanesulfonyl chloride in pyridine according to the method of Example II to give a 3-methoxy-16α,17α-methoxymethylenedioxy-21-methanesulfonyloxy - 3,5-pregnadiene-20-one.

EXAMPLE XIV

*Preparation of 16α,17α-Dihydroxy-21 - Methanesulfonyloxy-4-Pregnene-3,20-Dione*

The compound 3-methoxy-16α,17α-methoxymethylenedioxy-21 - methanesulfonyloxy-3,5 - pregnadiene-20-one in absolute methanol is hydrolyzed with dilute hydrochloric acid according to the method of Example III to give 16α,17α-dihydroxy-21 - methanesulfonyloxy-4-pregnene-3,20-dione.

EXAMPLE XV

*Preparation of 21-Iodo-9α-Fluoro-11β,16α,17α-Trihydroxy-1,4-Pregnadiene-3,20-Dione*

The compound 9α-fluoro-11β,16α,17α - trihydroxy-21-methanesulfonyloxy-1,4 - pregnadiene-3,20-dione, 6.50 g. (13.8 mmoles), is suspended in 300 ml. of acetone. Sodium iodide, 3.25 g. (21.7 mmoles) is dissolved in 200 ml. of acetone and the solution is added with stirring to the steroid suspension. The stirred mixture is refluxed for one hour and 20 minutes during which time the suspension thins considerably but at no time is complete solution effected. The hot mixture is filtered, the solid (water soluble-sodium methanesulfonate) is washed with hot acetone and the combined filtrates are refrigerated overnight. The first crop of long, fine colorless needles is removed by filtration, washed with cold acetone and finally air dried, 1.62 g., melting point 170.5–171.0° (dec.). A second crop of colorless solid is obtained by concentration of the combined mother liquors and washes, 5.26 g., melting point 169–170° (dec.). The yield is 6.88 g. (13.6 mmoles, 99.1%). Repeated recrystallization from acetone-petroleum ether (boiling point 60–70°) gives an analytical specimen of 21-iodo-9α-fluoro-11β,16α,17α-trihydroxy-1,4 - pregnadiene-3,20-dione, melting point 175.0–176.0° C. (dec., with violet vapor filling to tube spontaneously at 172°); $\nu_{max.}$ 1695, 1650, 1597, 1068 and 892 cm.$^{-1}$; $[\alpha]_D^{25°}$ +87° (c.=0.586, DMF, 1 dm.);

$\lambda_{max.}^{MeOH}$ 239 mμ, ε = 17,400

EXAMPLE XVI

*Preparation of 21-Chloro-9α-Fluoro-11β,16α,17α-Trihydroxy-1,4-Pregnadiene-3,20-Dione*

The compound 9α-fluoro-11β,16α,17α-trihydroxy-21-methanesulfonyloxy-1,4-pregnadiene-3, 20-dione (0.75 g.), lithium chloride (202 mg.) and dimethylformamide (30 ml.) is refluxed for 50 minutes, concentrated under reduced pressure to a small volume and treated with water. The solid so obtained is separated by filtration and recrystallized from acetone-petroleum ether (boiling point 60–70°) and from isopropanol; weight 278 mg., melting point 261–263° dec. The sample for analysis is obtained by recrystallization from methanol which lowers the melting point to 250–251° dec.; λ 239 mμ (ε 15,300); $\nu_{max.}$ 3330, 1739, 1678, 1627 and 1610 cm.$^{-1}$; $[\alpha]_D^{25°}$ +83° (dioxane).

In other runs it was found that the reflux time may be successfully shortened to 8 minutes or that the reaction mixture may be simply stirred at room temperature for 45 minutes.

EXAMPLE XVII

*Preparation of 9α-Fluoro-11β,16α,17α,21-Tetrahydroxy-1,4-Pregnadiene-3,20-Dione - 21 - Sodium - Hydrogen Phosphate*

Phosphoric acid (15.6 ml., 85%) and trisilver phosphate (41.5 g.) are combined with cooling and intimately mixed to form a paste. Acetonitrile, 160 ml., is added and to the stirred suspension is added 25.0 g. of 21-iodo-9α-fluoro-11β,16α,17α,trihydroxy - 1,4 - pregnadiene-3,20-dione and finally an additional 160 ml. of acetonitrile. The mixture is heated at reflux temperature for 4 hours, cooled to room temperature and finally filtered through diatomaceous earth to remove insoluble solids. The filter cake is washed with methanol and the combined filtrates are treated batchwise with a sulfonic acid cation exchange resin (H⁺ cycle) until the solution is free of silver ion and exhibits an apparent pH of about 2. The solution is passed slowly through a column of a weakly basic ion exchange resin (OH⁻ cycle) which treatment effectively removes inorganic phosphate ions from the methanol-acetonitrile solution of steroid phosphate. The solution is adjusted to pH 5.2 with a 2% solution of sodium methoxide (total volume—2530 ml.). The solution is evaporated to a small volume under reduced pressure, diluted with ether and the resultant suspension is refrigerated overnight. The product is collected by filtration, washed with ether and air dried to give 20.0 g. of 9α-fluoro-11β, 16α,17α,21-tetrahydroxy-1,4-pregnadiene - 3,20 - dione-21-sodium-hydrogen phosphate. Qualitative paper strip chromatography in the system isopropanol/conc. ammonium hydroxide/water (7:1:2) indicates trace contaminants of non-phosphorylated steroids at $R_f$ 0.85 and no inorganic phosphate contaminants ($R_f$ 0.08). The major component (steroid-21-phosphate) appears as a strong spot at $R_f$ 0.45.

EXAMPLE XVIII

*Preparation of 9α-Fluoro-11β,16α,17α,21-Tetrahydroxy-1,4-Pregnadiene-3,20-Dione-21-Sodium Hydrogen Phosphate*

The compound 21-chloro-9α-fluoro-11β,16α,17α-trihydroxy-1,4-pregnadiene-3,20-dione is treated with 85% phosphoric acid and trisilver phosphate according to the method of Example XVII to give the monosodium salt of 9α - fluoro-11β,16α,17α,21-tetrahydroxy-1,4-pregnadiene-3,20-dione-21-phosphate of purity comparable to that of the product of Example XVII. $R_f$ 0.45 [system isopropanol/conc. ammonium hydroxide/water (7:1:2)].

EXAMPLE XIX

*Preparation of 9α-Fluoro-11β,16α,17α,21-Tetrahydroxy-1,4-Pregnadiene-3,20-Dione-21-Triethylammonium Hydrogen Phosphate*

The product of Example XVII (impure monosodium salt of 9α,fluoro-11β,16α,17α,21-tetrahydroxy-1,4-pregnadiene-3,20-dione-21-phosphate), 4.98 g., is taken up in 70 ml. of the lower phase of the system N/10 ammonium hydroxide-n-butanol and extracted with four small portions of the upper phase of the same two-phase system. The aqueous, ammoniacal steroid solution is treated batchwise with a sulfonic acid ion exchange resin (H+ cycle) until the solution shows a constant pH of about 2. The solution is then treated batchwise with a sulfonic acid ion exchange resin [$HN(C_2H_5)_3^+$ cycle] until the solution is pH 4.2 and constant. The solution is flushed with nitrogen under reduced pressure to remove dissolved n-butanol and is finally freeze dried to give 3.61 g. of the mono triethylammonium salt of 9α-fluoro-11β,16α,17α,21-tetrahydroxy-1,4-pregnadiene-3,20-dione-21-phosphate as colorless solid, melting point 163–170° (dec.);

$\lambda_{max.}^{MeOH}$ 240 mμ, ε = 16,500

$[α]_D^{25°}$ +49° (methanol); molecular weight [via alkaline titration of the resin (sulfonic acid ion exchange resin H+) regenerated free phosphate], 611 (calcd. 601).

When chromatographed at the 300 microgram level on paper in the system isopropanol/conc. ammonium hydroxy/water (7:1:2) only a single spot ($R_f$ 0.41) is observed.

EXAMPLE XX

*Preparation of 9α-Fluoro-11β,16α,17α,21-Tetrahydroxy-1,4-Pregnadiene-3,20-Dione-21-Disodium Phosphate*

The product of Example XVII (impure monosodium salt of 9α-fluoro-11β,16α,17α,21-tetrahydroxy-1,4-pregnadiene-3,20-dione-21-phosphate) 10 g., is taken up in 250 ml. of the lower phase of the system N/10 ammonium hydroxide-n-butanol and the resulting solution is extracted with several small portions of the upper (butanol) phase of the same system. This treatment effectively removes nonphosphorylated steroid contaminants. The solution, pH 9.25, is treated (columnwise) with a sulfonic acid ion exchange resin (Na+ cycle) until the solution exhibits a constant pH of about 11. The pH of the solution is then lowered to about 6 by batchwise treatment with a sulfonic acid ion exchange resin (H+ cycle). At this point the dissolved steroid phosphate exists as a mixture of the mono- and disodium salts uncontaminated with excess ammonium hydroxide, sodium hydroxide and nonphosphorylated steroid. The solution is titrated to pH 8.25 (the pH of the steroid-21-phosphate disodium salt) with a dilute solution of sodium hydroxide. The solution is flushed with nitrogen under reduced pressure to remove dissolved butanol and then freeze dried to give 9.20 g. of hydrated 9α-fluoro-11β,16α,17α,21-tetrahydroxy-1,4-pregnadiene-3,20-dione-21-disodium phosphate as colorless solid. Paper chromatography in the system isopropanol/conc. ammonium hydroxide/water (7:1:2) showed a single spot, $R_f$ 0.45. Solubility of the product in water is in excess of 600 mg/ml.

EXAMPLE XXI

*Preparation of 9α-Fluoro-11β,16α,17α21-Tetrahydroxy-1,4-Pregnadiene-3,20-Dione-21-Dihydrogen Phosphate*

The product of Example XX (hydrated 9α-fluoro-11β,16α,17α,21-tetrahydroxy-1,4-pregnadiene-3,20-dione-21-disodium phosphate), in absolute methanol, is treated batchwise with a sulfonic acid ion exchange resin (H+ cycle). A small aliquot of this solution when diluted with water shows a pH of 2.6. The methanolic solution of the steroid-21-dihydrogen-phosphate is evaporated to dryness under reduced pressure. The residue is crystallized by slow evaporation in a concentrated acetone solution. The crystalline product is recrystallized from acetone (trace methanol)-petroleum ether (60–70°) to give hydrated 9α-fluoro-11β,16α,17α,21-tetrahydroxy-1,4-pregnadiene-3,20-dione-21-dihydrogen phosphate as colorless crystalline solid. Paper chromatography in the system isopropanol/conc. ammonium hydroxide/water (7:1:2) showed a single spot, $R_f$ 0.45.

EXAMPLE XXII

*Preparation of 9α-Fluoro-11β,16α,17α,21-Tetrahydroxy-1,4-Pregnadiene-3,20-Dione-21-Phosphate, Piperazine Salt*

The product of Example XX (hydrated 9α-fluoro-11β,16α,17α,21-tetrahydroxy-1,4-pregnadiene-3,20-dione-21-disodium phosphate), 1.00 g., is dissolved in 8 ml. of water and the solution is adjusted to pH 8.5 with diluted sodium hydroxide solution. The resulting solution is added with stirring to 15 ml. of a hot aqueous solution containing 1.00 g. of piperazine diacetate. The white solid which forms almost immediately is filtered from the hot solution, washed with water then methanol and is finally air dried. A second crop is collected, washed and dried in the same manner, total yield 0.83 g. Vacuum drying at 56° for 6 hours gives the monohydrate of 9α-fluoro-11β,16α,17α,21-tetrahydroxy-1,4-pregnadiene-3,20-dione-21-phosphate, piperazine salt, melting point 240° (dec.);

$\lambda_{max.}^{MeOH}$ 238 mμ, (ε15,200)

We claim:

1. A method of preparing compounds of the formula:

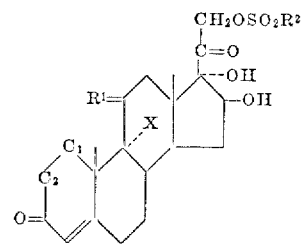

wherein —$C_1$—$C_2$— is a divalent radical of the group consisting of

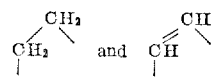

X is a monovalent radical of the group consisting of hydrogen and fluorine radicals, $R^1$ is a member of the group consisting of

$H_2$=, and O= and $R^2$ is a member of the group consisting of lower alkyl and mononuclear aryl radicals which comprises reacting the corresponding 21-hydroxy steroids with an ortho ester having the formula:

$$R^3C(OR^4)_3$$

in which $R^3$ is a member of the group consisting of hydrogen and lower alkyl radicals and $R^4$ is a lower alkyl radical to produce compounds of the formula:

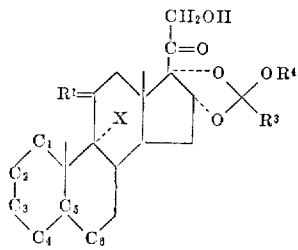

13 wherein $R^1$, $R^3$, $R^4$ and X are as defined above and —$C_1$—$C_2$—$C_3$—$C_4$—$C_5$—$C_6$— is a radical of the group consisting of

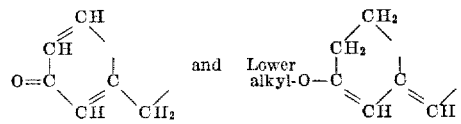

reacting the latter compounds with a member of the group consisting of lower alkylsulfonyl halides and mononuclear arylsulfonyl halides to produce compounds of the formula:

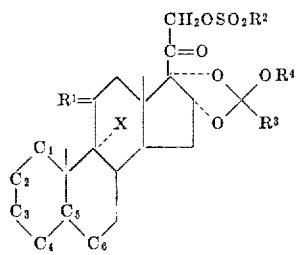

wherein $R^1$, $R^2$, $R^3$, $R^4$, X and —$C_1$—$C_2$—$C_3$—$C_4$—$C_5$—$C_6$— are as defined above, hydrolyzing the latter steroids with a mineral acid in the presence of a solvent inert to the reactants and recovering said compounds therefrom.

2. The compound 3 - methoxy - 11β - hydroxy - 16α, 17α - methoxymethylenedioxy - 21 - methanesulfonyloxy-3,5 - pregnadiene - 20 - one.

3. A process of preparing compounds of the formula:

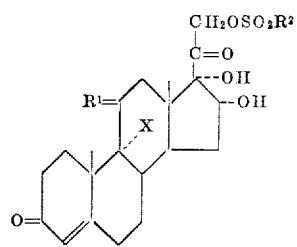

wherein X is a monovalent radical of the group consisting of hydrogen and fluorine radicals, $R^1$ is a member of the group consisting of

$H_2$=, and O= groups and $R^2$ is a member of the group consisting of lower alkyl and mononuclear aryl radicals which comprises reacting compounds of the formula:

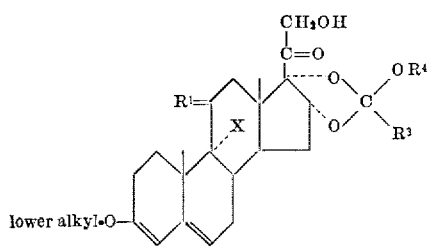

$R^1$ and X are as defined above, $R^3$ is a member of the group consisting of hydrogen and lower alkyl radicals, $R^4$ is a lower alkyl radical with a compound of the group consisting of lower alkylsulfonyl halides and mononuclear

14 arylsulfonyl halides to produce compounds of the formula:

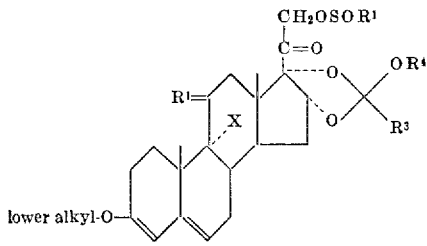

wherein $R_1$, $R_2$, $R_3$, $R_4$ and X are as defined above, hydrolyzing the latter steroids at least 40 minutes with a mineral acid in the presence of a solvent inert to the reactants and recovering said compound therefrom.

4. A process of preparing compounds of the formula:

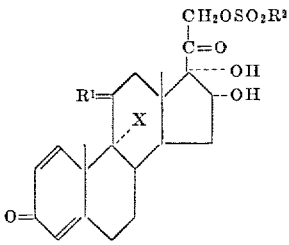

wherein $R^1$ is a member of the group consisting of

$H_2$=, and O= groups, X is a monovalent radical of the group consisting of hydrogen and fluorine radicals and $R^2$ is a member of the group consisting of lower alkyl and mononuclear aryl radicals which comprises reacting compounds of the formula:

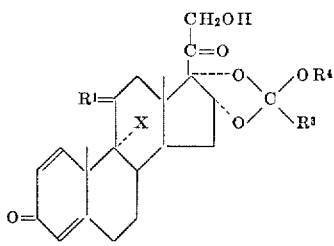

wherein $R^1$ and X are as defined above, $R^3$ is a member of the group consisting of hydrogen and lower alkyl radicals and $R^4$ is a lower alkyl radical with a compound of the group consisting of lower alkylsulfonyl halides and mononuclear arylsulfonyl halides to produce compounds of the formula:

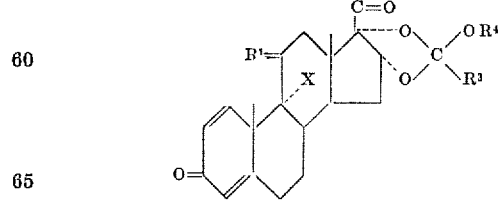

wherein $R^1$, $R^2$, $R^3$, $R^4$ and X are as defined above, hydrolyzing the latter steroid with a mineral acid in the presence of a solvent inert to the reactants and recovering said compound therefrom.

5. A process of preparing 11β,16α,17α-trihydroxy-21-methanesulfonyloxy-4-pregnene-3,20-dione which comprises reacting 3 - methoxy - 11β,21 - dihydroxy - 16α, 17α-methoxymethylenedioxy - 3,5 - pregnadiene - 20 - one with methanesulfonyl chloride to produce 3-methoxy-11β- hydroxy - 16α,17α - methoxymethylenedioxy - 21 - methanesulfonyloxy - 3,5 - pregnadiene - 20 - one, subsequently hydrolyzing with a mineral acid in the presence of a solvent inert to the reactants and recovering said compound therefrom.

6. A process of preparing 9α-fluoro-11β,16α,17α-trihydroxy - 21 - methanesulfonyloxy - 1,4 - pregnadiene - 3,20-dione which comprises reacting 9α-fluoro-11β,21-dihydroxy - 16α,17α - methoxymethylenedioxy - 1,4 - pregnadiene-3,20-dione with methanesulfonyl chloride to produce 9α - fluoro - 11β - hydroxy - 16α,17α - methoxymethylenedioxy - 21 - methanesulfonyloxy - 1,4 - pregnadiene-3,20-dione, subsequently hydrolyzing with a mineral acid in the presence of a solvent inert to the reactants and recovering said compound therefrom.

7. A process of preparing 9α-fluoro-11β,16α,17α-trihydroxy - 21 - p - toluenesulfonyloxy - 1,4 - pregnadiene-3,20-dione which comprises reacting 9α-fluoro-11β,21-dihydroxy - 16α,17α - methoxymethylenedioxy - 1,4 - pregnadiene-3,20-dione with p-toluenesulfonyl chloride to produce 9α-fluoro-11β-hydroxy-16α,17α-methoxymethylenedioxy - 21 - p - toluenesulfonyloxy - 1,4 - pregnadiene - 3,20-dione, subsequently hydrolyzing with a mineral acid in the presence of a solvent inert to the reactants and recovering said compound therefrom.

References Cited in the file of this patent
UNITED STATES PATENTS

| | | |
|---|---|---|
| 2,903,449 | Fried et al. | Sept. 8, 1959 |
| 2,949,476 | Tyner | Aug. 16, 1960 |
| 2,966,486 | Smith et al. | Dec. 27, 1960 |

OTHER REFERENCES

Smith et al.: J.A.C.S., 82, September 5, 1960, pages 4625–2629.

UNITED STATES PATENT OFFICE
CERTIFICATE OF CORRECTION

Patent No. 3,087,927                                                     April 30, 1963

Robert B. Brownfield et al.

It is hereby certified that error appears in the above numbered patent requiring correction and that the said Letters Patent should read as corrected below.

Column 6, lines 50 and 51, strike out "Preparation of 9α-Fluoro-11β-Hydroxy-16α,17α-Methoxy-Methoxymethylenedioxy-1,4-Pregnadiene-3,20-Dione", in italics, and insert instead -- Preparation of 9α-Fluoro-11β,21-Dihydroxy-16α,17α-Methoxymethylenedioxy-1,4-Pregnadiene-3,20-Dione --, in italics.

Signed and sealed this 10th day of December 1963.

(SEAL)
Attest:

ERNEST W. SWIDER
Attesting Officer

EDWIN L. REYNOLDS

Acting Commissioner of Patents